United States Patent
Kwon et al.

(10) Patent No.: US 11,700,044 B2
(45) Date of Patent: Jul. 11, 2023

(54) APPARATUS AND METHODS FOR MULTI-AP JOINT TRANSMISSION AND RECEPTION

(71) Applicant: NXP USA, Inc., Austin, TX (US)

(72) Inventors: Young Hoon Kwon, Laguna Niguel, CA (US); Liwen Chu, San Ramon, CA (US); Sudhir Srinivasa, Los Gatos, CA (US); Hongyuan Zhang, Fremont, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 179 days.

(21) Appl. No.: 17/094,645

(22) Filed: Nov. 10, 2020

(65) Prior Publication Data

US 2021/0143884 A1 May 13, 2021

Related U.S. Application Data

(60) Provisional application No. 62/983,292, filed on Feb. 28, 2020, provisional application No. 62/980,345, filed on Feb. 23, 2020, provisional application No. 62/933,863, filed on Nov. 11, 2019.

(51) Int. Cl.
*H04B 7/06* (2006.01)
*H04W 72/04* (2023.01)
*H04B 7/0413* (2017.01)
*H04W 88/06* (2009.01)
*H04W 88/02* (2009.01)

(52) U.S. Cl.
CPC ......... *H04B 7/0626* (2013.01); *H04B 7/0413* (2013.01); *H04W 72/04* (2013.01); *H04W 88/02* (2013.01); *H04W 88/06* (2013.01)

(58) Field of Classification Search
CPC .. H04B 7/0617; H04B 7/0626; H04B 7/0413; H04B 7/0632; H04W 84/12; H04W 88/08; H04W 72/04; H04W 88/02; H04W 72/0406; H04W 74/0858; H04W 84/18; H04W 88/06
See application file for complete search history.

(56) References Cited

U.S. PATENT DOCUMENTS

| | | | |
|---|---|---|---|
| 2017/0094685 A1* | 3/2017 | Noh | H04W 74/0816 |
| 2017/0208625 A1* | 7/2017 | Choi | H04W 74/006 |
| 2018/0324859 A1* | 11/2018 | Kim | H04W 74/0816 |
| 2019/0261419 A1* | 8/2019 | Noh | H04W 74/0816 |
| 2019/0357256 A1* | 11/2019 | Kim | H04W 74/006 |
| 2021/0044333 A1* | 2/2021 | Jiang | H04B 7/0619 |
| 2021/0345401 A1* | 11/2021 | Lopez-Perez | H04W 74/0808 |

FOREIGN PATENT DOCUMENTS

WO   WO-2020022814 A1 *  1/2020  ........ H04W 74/0808

* cited by examiner

*Primary Examiner* — Allahyar Kasraian

(57) ABSTRACT

Various embodiments relate to a system and method for joint sounding by a client with a master access point (AP) and a slave (AP), including: receiving a message from the master AP; applying network allocation vector (NAV) rules to update a NAV values, wherein the received message is treated as an intra-basic service set (BSS) message when the transmit address (TA) of the received message has a pre-specified value; receiving a first trigger frame; and transmitting a first channel state information (CSI) to the master AP when the channel is idle based upon the updated NAV value in response to the trigger frame.

9 Claims, 12 Drawing Sheets

APPARATUS AND METHODS FOR MULTI-AP JOINT TRANSMISSION AND RECEPTION

CROSS-REFERENCE TO RELATED APPLICATIONS

This application claims benefit to U.S. Provisional Patent Application No. 62/980,345 filed Feb. 23, 2020, U.S. Provisional Patent Application No. 62/983,292 filed Feb. 28, 2020, and U.S. Provisional Patent Application No. 62/933,863 filed Nov. 11, 2019, the contents of which are hereby incorporated by reference for all purposes as if fully set forth herein.

TECHNICAL FIELD

Various exemplary embodiments disclosed herein relate generally to apparatus and methods for multi-AP joint transmission and reception.

BACKGROUND

Multiple-input and multiple-output (MIMO) is a method for increasing the capacity of a radio link using multiple transmit and receive antennas to exploit multipath propagation. MIMO is currently used in a variety of standards, including for example, IEEE 802.11n (WiFi), IEEE 802.11ac (WiFi), IEEE 802.11ax (WiFi), IEEE 802.11be (WiFi), HSPA+ (3G), WiMAX, and Long Term Evolution (4G LTE).

Distributed MIMO (DMIMO) is where multiple access points (APs) jointly transmit a download transmission to one station (STA). The use of additional APs and additional antennas allows for increased transmission power and gain. Further, the use of beam forming may further increase the gain of the antennas and hence increase performance.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for joint sounding by a client with a master access point (AP) and a slave AP, including: receiving a message from the master AP; applying network allocation vector (NAV) rules to update NAV values, wherein the received message is treated as an intra-basic service set (BSS) message when the transmit address (TA) of the received message has a prespecified value; receiving a first trigger frame; and transmitting a first channel state information (CSI) to the master AP when the channel is idle based upon the updated NAV value in response to the trigger frame.

Various embodiments are described that may further include: receiving a second message from the slave AP after the first CSI is transmitted; receiving a second trigger frame from the master AP; and transmitting a second channel state information (CSI) to the slave AP when the channel is idle based upon the updated NAV value in response to the second trigger frame.

Various embodiments are described, wherein the received message is further treated as an intra-basic service set (BSS) message when a parameter TXOP_DURATION of the received message is set to UNSPECIFIED.

Various embodiments are described, wherein the received message is further treated as an intra-basic service set (BSS) message when a parameter BSS_COLOR of the received message is set to a predetermined value.

Various embodiments are described, wherein the received message is further treated as an intra-basic service set (BSS) message when a receive address (RA) field is set to a broadcast address and a client identifier for the client is included in the first message.

Further various embodiments relate to a method for joint sounding by a client with a master access point (AP) and a slave (AP), including: receiving a message from the master AP; applying network allocation vector (NAV) rules to update a NAV values, wherein the received message is treated as an intra-basic service set (BSS) message when the transmit address (TA) of the received message is equal to the TA of any of APs participating in the joint sounding, a receive address (RA) field is set to a broadcast address, and a client identifier for the client is included in the first message; receiving a first trigger frame; and transmitting a first channel state information (CSI) to the master AP when the channel is idle based upon the updated NAV value in response to the trigger frame.

Various embodiments are described that may further include: receiving a second message from the slave AP after the first CSI is transmitted; receiving a second first trigger frame from the master AP; and transmitting a second channel state information (CSI) to the slave AP when the channel is idle based upon the updated NAV value in response to the second trigger frame.

Various embodiments are described, wherein the received message is further treated as an intra-basic service set (BSS) message when a parameter TXOP_DURATION of the received message is set to UNSPECIFIED.

Various embodiments are described, wherein the received message is further treated as an intra-basic service set (BSS) message when a parameter BSS_COLOR of the received message is set to a predetermined value.

Further various embodiments relate to a method for transmission sharing by a sharing access point (AP), including: transmitting a trigger frame that defines for a plurality of shared APs the frequency bandwidth and timeframe for transmitting during the sharing APs transmission period; receiving a block acknowledge (BA) frame from at least of the plurality of shared APs; receiving a last frame (LF) frame from the least of the plurality of shared APs; transmitting a data frame on frequency bandwidths associated with at least one of the plurality of shared APs for which a LF frame was received.

Various embodiments are described, wherein the sharing AP indicates information regarding the physical parameters to use for the transmission of the last frame using the trigger frame.

Various embodiments are described, wherein the LF is carried in one of a non-HT physical protocol data unit (PPDU) format and non-HT duplicate PPDU format.

Various embodiments are described, wherein a shared AP transmits the LF on a frequency resource within the scheduled frequency resource that the shared AP received an acknowledgement frame from a peer station.

Various embodiments are described, wherein the frequency bandwidths associated with at least one of the plurality of shared APs for which a LF frame was received includes a subset of the frequency bandwidths associated with at least one of the plurality of shared APs for which a LF frame was received.

Various embodiments are described, wherein frequency bandwidths associated with at least one of the plurality of shared APs for which a LF frame was received is an integer multiple of 20 MHz channels.

Further various embodiments relate to a method for sharing a transmission opportunity (TXOP) of a master access point (AP) with a first station (STA), including: transmitting a first frame from the master AP, wherein the first frame is an initial frame that obtains the TXOP; transmitting a second frame from the master AP, wherein the first frame includes an indication that the master AP shares the TXOP with the first STA within the TXOP; transmitting a first trigger frame from the master AP to the first STA, wherein the first trigger frame schedules a first service period (SP) indicates that the master AP's TXOP is shared with the first STA during the first SP; and identifying that the first SP is completed and that there a TXOP duration remains, and resuming a frame exchange by transmitting a third frame from the master AP.

Various embodiments are described, wherein the first STA is a set of APs, a first AP within the set of AP corresponds to a transmitted BSSID, and a second AP within the set of AP corresponds to a non-transmitted BSSID.

Various embodiments are described, wherein identifying that the first SP is completed includes the master AP receiving a fourth frame from the first STA, wherein the fourth frame includes an indication that the fourth frame is the last frame during the first SP.

Various embodiments are described, wherein identifying that the first SP is completed includes the master AP assessing that a wireless medium is idle for a predetermined time duration from the end of the first SP.

Various embodiments are described, wherein the predetermined time duration is PIFS.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
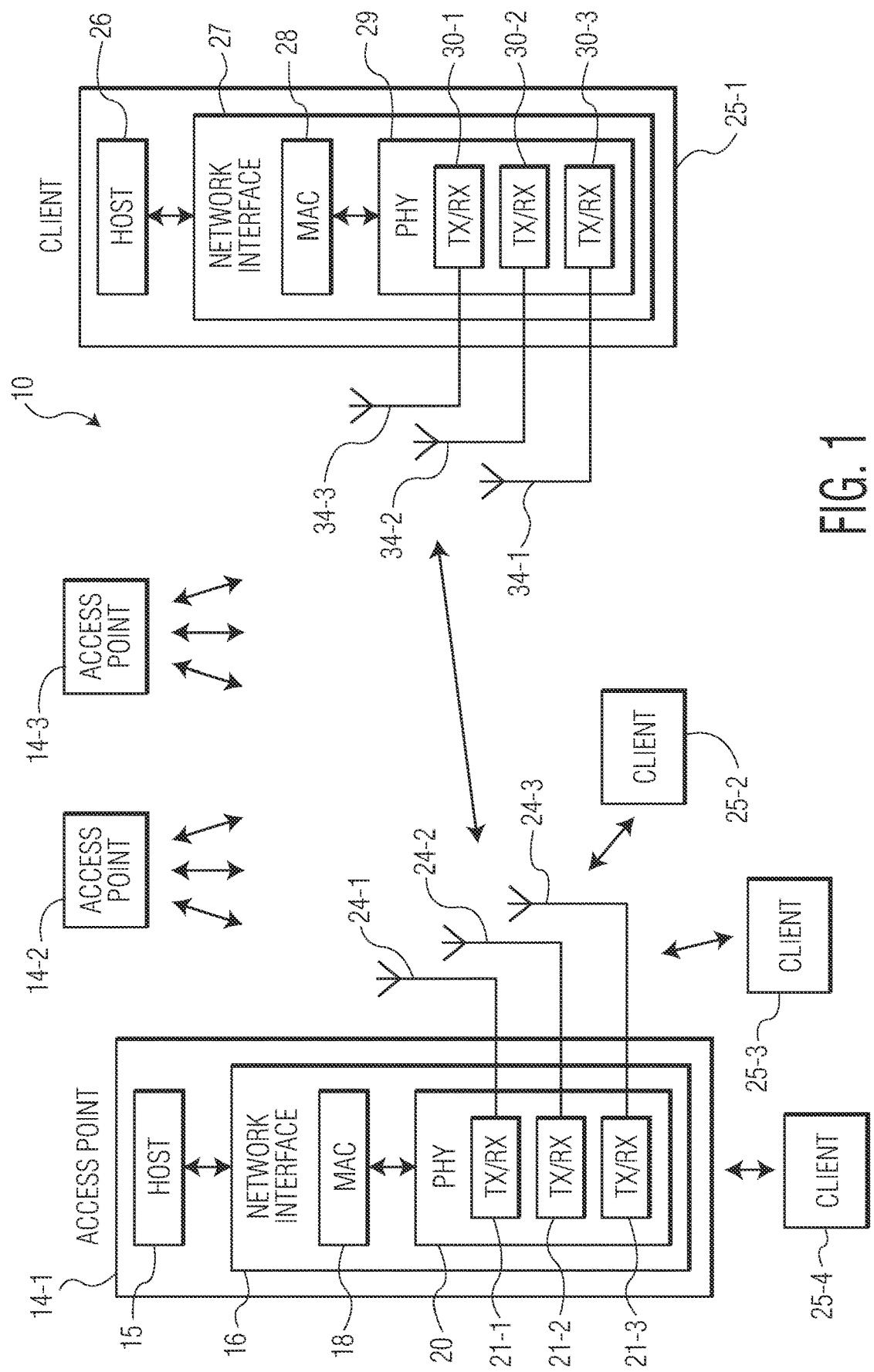
FIG. 1 is a block diagram of an example wireless local area network (WLAN), according to an embodiment.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

In the embodiments described below, a wireless network device such as an access point (AP) of a wireless local area network (WLAN) simultaneously transmits independent data streams to multiple client stations and/or receives independent data streams simultaneously transmitted by multiple client stations. In particular, the AP transmits data for the multiple clients in different sub-channels of an orthogonal frequency division multiplexing (OFDM) communication channel, in various embodiments. In an embodiment, the sub-channels indicate bandwidth in an orthogonal frequency division multiple access (OFDMA) transmission. In another embodiment, the sub-channels are space time streams of a multiuser multiple input, multiple output (MU-MIMO) communication channel. In another embodiment, transmissions from the APs to the clients may be time division multiplexed (TDM) in order to communicate with a multiple clients. Similarly, multiple client stations simultaneously transmit data to the AP, in particular, each client station transmits data in a different OFDM sub-channel, in various embodiments.

In other embodiments, distributed MIMO (DMIMO) may be used where multiple APs jointly transmit a download transmission to one or multiple client stations.

The AP is configured to operate with client stations according to at least a first communication protocol. The first communication protocol is sometimes referred to herein as "extremely high throughput WiFi", EHT communication protocol, or 802.11be communication protocol. In an embodiment, the first communication protocol supports OFDMA communication between the AP and the client stations. In an embodiment, EHT supports MU-MIMO communication between the AP and the client stations. EHT also supports joint transmission (T) and coordinated beamforming (CBF). In JT multiple APs transmit/received data frames to/from a target station simultaneously. In CBF multiple APs transmit/receive data from to/from their own target station simultaneously while minimizing interference to other stations of the participating APs. In some embodiments, different client stations in the vicinity of the AP are configured to operate according to one or more other communication protocols that define operation in the same frequency band as the EHT communication protocol but with generally lower data throughputs. The lower data throughput communication protocols (e.g., IEEE 802.11ax, IEEE 802.11n, IEEE 802.11ac, and/or IEEE 802.11ax) are collectively referred herein as "legacy" communication protocols.

In an embodiment, client stations that are configured to operate according to the EHT communication protocol generally support OFDMA communication and/or MIMO communication initiated by the AP. In some embodiments, client stations that are configured to operate according to the EHT communication protocol optionally support OFDMA communication and/or MU-MIMO communication initiated by the client stations.

FIG. 1 is a block diagram of an example wireless local area network (WLAN) 10, according to an embodiment. An AP 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 may include different numbers (e.g., 1, 2, 4, 5, etc.) of transceivers 21 and antennas 24 in other embodiments. The WLAN 10 may include multiple APs 14-1, 14-2, 14-3 as shown, but any number of APs 14 may be included in WLAN 10.

The WLAN 10 includes a plurality of client stations 25. Although four client stations 25 are illustrated in FIG. 1, the WLAN 10 may include different numbers (e.g., 1, 2, 3, 5, 6, etc.) of client stations 25 in various scenarios and embodiments. Two or more of the client stations 25 are configured to receive corresponding data streams that are transmitted simultaneously by the AP 14. Additionally, two or more of the client stations 25 are configured to transmit corresponding data streams to the AP 14 such that the AP 14 simultaneously receives the data streams. Also, the client stations 25 are configured to receive data streams that are transmitted simultaneously by multiple APs 14. This may be done using JT or CBF. Likewise, the client stations 25 may transmit data streams simultaneously to the multiple APs 14.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 may include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the APs 14 and the client stations 25 contend for communication medium using carrier sense multiple access with collision avoidance (CSMA/CA) protocol or another suitable medium access protocol. Further, in an embodiment, the APs 14 or a client station 25 dynamically selects a bandwidth for a transmission based on channels available for the transmission.

In an embodiment, the APs 14 are configured to simultaneously transmit different OFDM units to different client stations 25 by forming an OFDMA data unit that includes the different OFDM data units modulated in respective sub-channel blocks of the OFDMA data unit. In an embodiment, the AP 14 allocates different sub-channels to different client stations and forms the OFDMA data unit that includes OFDM data units directed to by modulating the different client stations in sub-channel blocks corresponding to the sub-channels assigned to the client stations.

In an embodiment, the APs 14 are configured to simultaneously transmit different OFDM units to different client stations 25 by transmitting the different OFDM data units via different space time streams of a MU-MIMO communication channel. In an embodiment, the APs 14 allocates different sub-channels (i.e., space time streams) to different client stations and forms the OFDM data units and modulates the different OFDM data units to the space time streams corresponding to the sub-channels assigned to the client stations.

During the development of the IEEE 802.11be (EHT), the concept of multiple APs' simultaneous transmission has been discussed. There are two main techniques for multiple APs' simultaneous transmission: joint transmission (JT) and coordinated beamforming (CBF). In JT multiple APs transmit/receive data frames to/from a target station (STA) simultaneously. In CBF multiple APs transmit/receive data frames to/from their own target STA simultaneously while minimizing interference to STAs of participating APs. For both JT and CBF, each participating AP needs to identify channel information of not only its own associated STAs but also STAs of the other participating APs. Therefore, a joint sounding procedure is needed for APs to obtain channel information from each of the stations. For a joint sounding procedure, one AP may trigger STAs under participating APs to send channel feedback results. Sequential and parallel mechanisms have been identified.

Figure 2A:
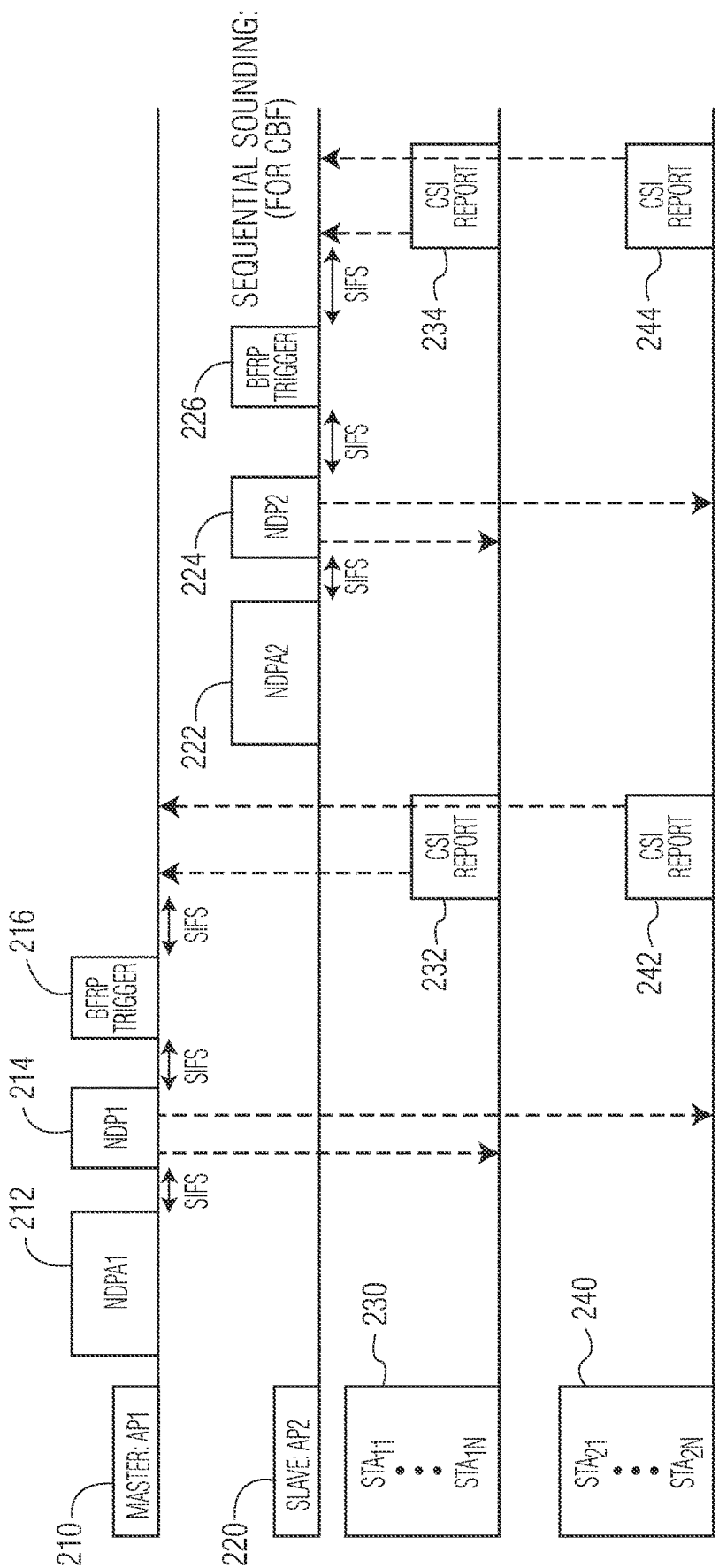
FIGS. 2A and 2B illustrate an example of sequential joint sounding and parallel joint sounding respectively.
Figure 2B:
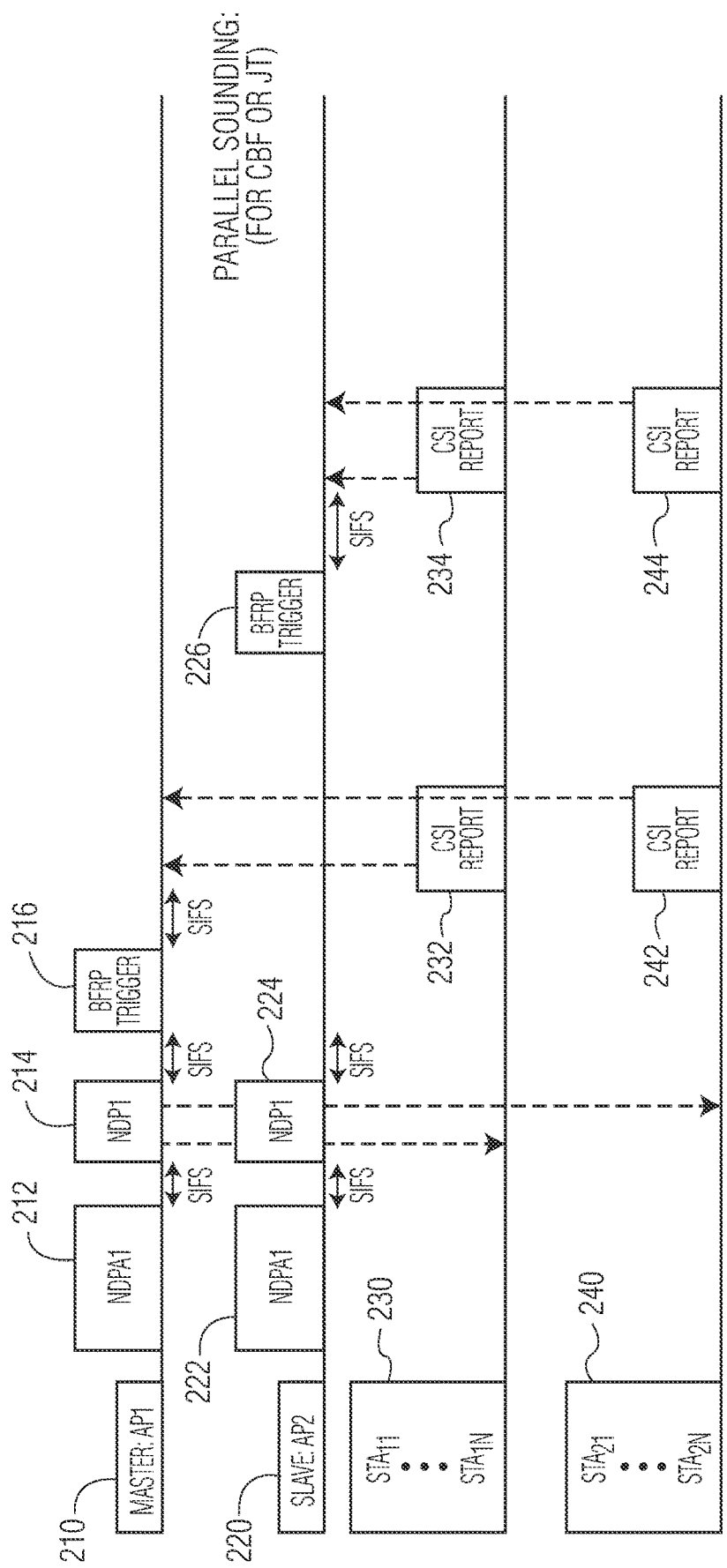

FIGS. 2A and 2B illustrate an example of sequential joint sounding and parallel joint sounding respectively. In FIG. 2A there is a master AP1 210 and a slave AP2 220. AP1 210 has an associated set of stations $STA_{11}$ ... $STA_{1N}$ that form a basic service set (BSS). The AP2 220 has an associated set of stations $STA_{21}$ ... $STA_{2N}$ that form another basic service set BSS. The master AP1 210 transmits an null data packet announcement (NPDA) frame 212 that identifies the intended recipients of the forthcoming sounding frame. This frame will include the identification of stations from $STA_{11}$ ... $STA_{1N}$ and $STA_{21}$ ... $STA_{2N}$. Then the master AP1 210 will transmit a sounding or null data packet (NDP) 214 that does not contain data, but includes reference signals that may be used to characterize the transmission channel. Next, the master AP1 210 will transmit a beamforming report poll (BFRP) trigger frame that triggers the various stations to transmit a channel state information (CSI) frames 232, 242 indicating the status of the channel between the STAs 230, 240 and the master AP1 210. Likewise, after the CSI reports 232, 242 have been received, the slave AP2 220 then sends out NPDA2 222, NPD2 224, and BFRP trigger 226 to the STAs 230, 240 and receives CSI reports 234, 244 indicating the status of the channel between the slave AP2 and the STAs 230, 240. As can be seen this sounding is done sequentially where the master AP1 210 first sends out messages followed by the slave AP2 220. It is noted that if additional slave APs are part of the system, those slave APs would sequentially send out their sounding messages. Further, the various messages may be sent out with a short interframe space (SIFS) to allow for the receipt and processing of frame and for a response to be sent. While NPDA, NPD, and BFRP frames were used as examples, other announcement, sounding, and trigger types of frames may be used. Sequential sounding may be used with CBF.

FIG. 2B is an example of parallel sounding. In parallel sounding the master AP1 210 and the slave AP2 send out NDPA frames 212, 222 at the same time. The master AP1 210 provides information to the slave AP2 regarding the coordination, timing, and content of the sounding messages. In parallel sounding, the master AP1 210 then sends a BFRP trigger 216 and receives CSI reports 232, 242 from the STAs 230, 240 in response. After the CSI reports 232, 242 are transmitted, the slave AP2 220 sends a BFRP trigger 226 and receives CSI reports 234, 244 from STAs 230, 240 in response. It is noted that if additional slave APs are part of the system, those slave APs would send out their sounding messages in parallel as well. While NPDA, NPD, and BFRP frames were used as examples, other announcement, sounding, and trigger types of frames may be used. Sequential sounding may be used with CBF. Parallel sounding may be used with CBF and JT.

IEEE 802.11 networks may use a network allocation vector (NAV). NAV is a virtual carrier-sensing mechanism used with wireless network protocols. The virtual carrier-sensing is a logical abstraction which limits the need for physical carrier-sensing at the air interface in order to save power. The MAC layer frame headers contain a duration field that specifies the transmission time required for the frame, in which time the medium will be busy. The stations listening on the wireless medium read the duration field and set their NAV, which is an indicator for a station on how long it must defer from accessing the medium. The NAV may be thought of as a counter, which counts down to zero at a uniform rate. When the counter is zero, the virtual carrier-sensing indication is that the medium is idle; when nonzero, the indication is busy. The medium shall be determined to be busy when the station (STA) is transmitting. In IEEE 802.11, the NAV represents the number of microseconds the sending STA intends to hold the medium busy (maximum of 32,767 microseconds). When the sender sends a request to send data, the receiver waits one SIFS before sending clear to send. Then the sender will wait again one SIFS before sending all the data. Again the receiver will wait a SIFS before sending an acknowledge ACK. So NAV is the duration from the first SIFS to the ending of ACK. During this time the medium is considered busy. So this leads to a challenge of dealing with intra-BSS and inter-BSS NAV updates.

The following is a description of the basic NAV setting rules. A STA shall update the basic NAV with the duration information indicated by the received frame in a physical service data unit (PSDU) if and only if all the following conditions are met:

the frame is identified as inter-BSS or cannot be identified as intra-BSS or inter-BSS according to the rule described in IEEE P802.11ax/D7.0 26.2.2 (Intra-BSS and inter-BSS PPDU (physical protocol data unit) classification);

the indicated duration is greater than the current basic NAV value; and the receive address (RA) of the received frame is not the STA's MAC address.

Further, a STA shall update the basic NAV with the duration information indicated by the RXVECTOR parameter TXOP_DURATION for an HE PPDU if and only if all the following conditions are met:

the RXVECTOR parameter TXOP_DURATION is not UNSPECIFIED;

the PPDU that carried information for the RXVECTOR parameter is identified as inter-BSS or cannot be identified as intra-BSS or inter-BSS according to the rule described in IEE 801.11 ax/D7.0 26.2.2 (Intra-BSS and inter-BSS PPDU classification);

the STA does not receive a frame with a Duration field in the PPDU; and the duration information indicated by the RXVECTOR parameter TXOP_DURATION is greater than the current basic NAV of the STA.

The above basic NAV rules may lead to problems when joint sounding is used. When a STA in an AP's BSS receives NDPA/NDP/BFRP_Trigger frames from another AP outside the STAs' BSS, the STAs' basic NAV is set to the values shown in the duration field of the frames. Then, the STAs cannot send back the CSI report unless the CS_required field in the BFRP trigger frame is set to zero. As the packet duration of the CSI report is not short, and as the CSI report includes channel information that may require transmission of the channel information without interference, it is highly likely that CS_required field in the BFRP Trigger frame shall be set to 1. Various embodiments will now be described to overcome this problem.

A solution to this problem may include considering the NDPA and BFRP trigger frame as an intra-BSS frame.

One way to do this is to set the value of TA in the NDPA and BFRP trigger frame to a specific TA. The specific TA may be announced before or during the joint sounding sequence. Different specific TAs may be used for different joint sounding sequences. If STAs in the BSS of APs that participate the joint sounding receive a frame that contains a TA field set to the specific TA, the STAs consider the frame as an intra-BSS frame. Hence, the problems identified above will not occur.

Another way to have the NDPA and BFRP frames to be considered as an intra-BSS frame includes transmitting a frame with the following conditions: the TA field is set to any of APs that participate the joint sounding (the list of APs participating may be announce before or during the joint sounding sequence); the RA field is set to the broadcast address; and the STA's identification (e.g., AID/PAID) is included in the frame body (e.g., STA Info n field in NDPA frame or User Info field in Trigger frame). If a frame is received meeting these conditions, then the STA considers the frame as an intra-BSS frame. Hence, the problems identified above will not occur.

Another option is to combine the two previous options. That is a NDPA and BFRP frames are considered to be an intra-BSS frame if the following conditions are met the TA of the NDPA and BFRP trigger frame is set to a specific TA; if the STAs in the BSS of APs that participate the joint sounding receive a frame that contains: a TA field set to the specific TA; an RA field set to the broadcast address; and the STA's identification (e.g., AID/PAID) is included in the frame body (e.g., STA Info n field in NDPA frame or User Info field in Trigger frame). If a frame is received meeting these conditions, then the STA considers the frame as an intra-BSS frame. Hence, the problems identified above will not occur.

Another approach to overcoming the intra-BSS NAV update challenge is to not update the NAV based on the NDPA and BFRP trigger frame and modifying the NAV set rules as follows. A STA shall update the basic NAV with the duration information indicated by the received frame in a PSDU if and only if all the following conditions are met:

the frame is identified as inter-BSS or cannot be identified as intra-BSS or inter-BSS according to the rule described in IEEE 802.11ax/D7.0 26.2.2 (Intra-BSS and inter-BSS PPDU classification);

the indicated duration is greater than the current basic NAV value;

the RA of the received frame is not the STA's MAC address; and the RA of the received frame is set to the broadcast address and the STA's identification (e.g., AID/PAID) is not included in the frame body (e.g., STA Info n field in NDPA frame or User Info field in Trigger frame).

An additional approach may also be considered that may be used along with the approaches described above, which operate at the message level. This approach operates at the PHY level by setting different TXVECTOR parameter values to predetermined values. A first option is to set the TXVECTOR parameter TXOP_DURATION to UNSPECIFIED for the NDP frame sent to OBSS STA. Another option is to set the TXVECTOR parameter BSS_COLOR to a predetermined value. This predetermined value indicates that the PPDU is for CAP (Coordinated AP) transmission.

Another approach is to define CAP (Coordinated AP) BSS NAV that specifically is used when CAP operation is used. On top of the basic NAV and intra-BSS NAV rules and processing, another NAV (CAP-BSS NAV) is defined with its own rules specifically for CAP processing.

The CAP-BSS NAV may be defined as follows. When a STA receives a frame, the STA checks if the frame transmitted by APs that are participating CAP transmission. CAP transmission implies that more than one AP is transmitting simultaneously with their transmission coordinated each other, such as CAP-OFDMA, JT, CBF, etc. If the frame is identified as transmitted by APs participating CAP transmission, the frame is a CAP-BSS frame and processed accordingly. If the received frame is a CAP-BSS frame, the STA updates its CAP-BSS NAV based on duration information of the CAP-BSS frame. The duration information may be obtained by the Duration/ID field in the MAC header of the frame. The duration information may also be obtained by PHY header part of the PPDU that carries the frame. If the STA has non-zero CAP-BSS NAV counter value when the STA receives a frame that solicits its transmission from one of APs participating CAP transmission, the STA can send the transmission if the STA's basic NAV has zero value and if the AP request channel is assessed to be idle a predetermined time before the transmission.

The application of the embodiments described above may be limited when a STA is in CAP transmission/reception only. The proposed embodiments may not be applied when a STA is not involved in a CAP transmission/reception. For example, even if a STA receives a frame with a TA set to a specific TA, the STA will not consider the frame as intra-BSS frame if the STA is not involved in CAP transmission/reception.

The application of the embodiments described above may be limited when a STA's associated AP participates the CAP transmission/reception. For example, even if a STA receives a frame from participating AP with the STA's info in the frame body, the STA will not consider the frame as intra-BSS frame if the STA's associated AP does not participate the CAP transmission/reception.

The embodiments described above are not limited to NDPA, NDP, or BFRP Trigger frames. If a STA is involved in CAP transmission/reception, the proposed mechanisms may be applied to any frames transmitted by an AP that participates the CAP transmission/reception that is for the CAP transmission/reception.

Coordinated AP transmission has been accepted to be included in IEEE 802.11be (EHT). That is, EHT shall define a procedure for an AP to share its frequency/time resources of an obtained transmission opportunity (TXOP) with a set of other APs. Coordinated OFDMA is supported in EHT, and in a coordinated OFDMA, both download (DL) OFDMA and its corresponding upload (UL) OFDMA acknowledgement are allowed. EHT shall define a mechanism to determine whether an AP is part of an AP candidate set and can participate as a shared AP in Coordinated AP transmission initiated by a sharing or master AP. An AP that intends to use the resource (i.e., frequency or time) shared by another AP shall be able to indicate its resource needs to the AP that is sharing the resource. An EHT AP supporting the Multi-AP coordination may send a frame (e.g., a Beacon or other management frame) including capabilities of Multi-AP transmission schemes. An EHT AP which obtains a TXOP and initiates the Multi-AP coordination is the Sharing AP. An EHT AP which is coordinated for the Multi-AP transmission by the Sharing AP is the Shared AP.

Coordinated spatial reuse (CSR) has been discussed for inclusion in EHT. Coordinated spatial reuse is parallel transmission of two APs in a coordinated way. Coordinated spatial reuse can be used when BSS1 and BSS2 are "relatively far" from each other, the meaning of "relatively far" is twofold: not near—interference is not so strong, nulling may not be needed, power control is enough; and not too far—the channel state is busy (received signal power >−82 dBm). In IEEE 802.11ax, spatial reuse can be used in this case, but it is in an uncoordinated way. In 802.11ax, many spatial reuse (SR) transmissions can be initiated, which makes the interference hard to control. With AP coordination in EHT, SR may be accomplished in a coordinated way, e.g., use a trigger frame to initialize the transmission. This has the advantage of being simple, having less feedback overhead as compared to co-BF, and having less interference as compared to SR.

Various issues may arise when implementing coordinated AP transmission. There may be multiple different coordinated AP/STA transmission schemes such as: coordinated AP (CAP) OFDMA; CAP TDMA; CSR; trigger based direct link transmission; etc. As each different coordinated AP/STA transmission scheme requires its own transmission sequence/protocol, supporting multiple coordinated AP/STA transmission schemes makes the IEEE 802.11be standard too complicated. When a TXOP sharing AP has a resource to share with other AP/STAs, it is not sure which mechanisms give the best overall system gain. Different coordinated AP/STA transmissions may require different information to be sent to the TXOP sharing AP, which makes the AP coordination too complicated or too much overhead.

Embodiments of a unified CAP-TX scheme will now be described. TXOP sharing AP may accommodate CAP-OFDMA/TDMA and CSR in one transmission sequence. While TXOP sharing AP shares its resource with entities on a resource in OFDMA or in TDMA manner, the more than one entities can use the same resource with the CSR mechanism, wherein the entity may be: a TXOP sharing AP; TXOP shared AP; non-AP STA participating Trigger based direct link transmission (D2D); or non-AP STA participating Trigger based UL transmission.

Figure 3A:
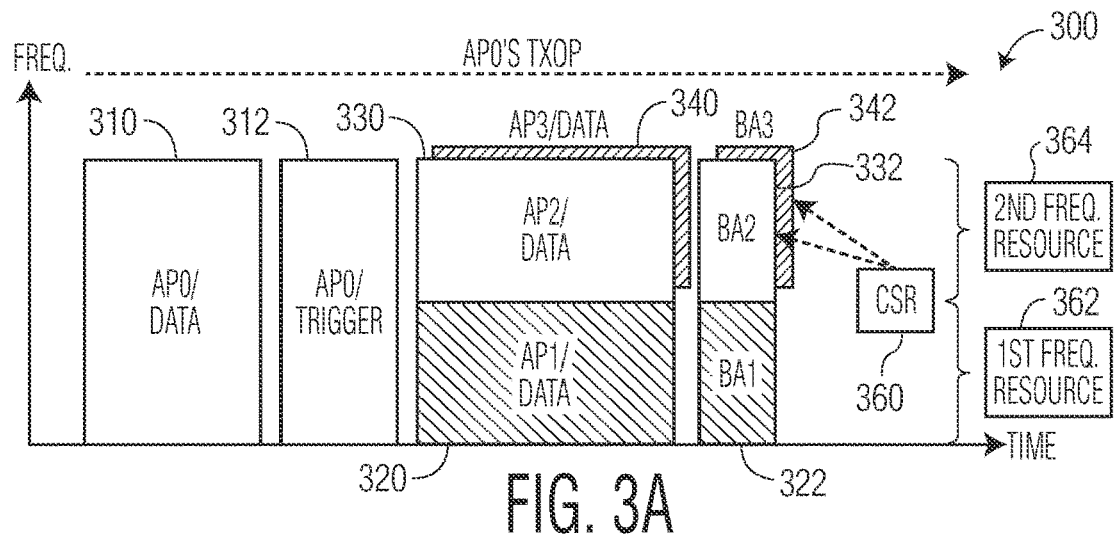
FIG. 3A illustrates the TXOP for AP0 using CAP-OFDMA and CSR.

FIGS. 3A-3D illustrate various CAP-TX scheme operating examples. FIG. 3A illustrates the TXOP 300 for AP0 using CAP-OFDMA and CSR. AP0 is the TXOP sharing AP.

During AP0's TXOP 300, AP0 shares its resources with AP1/AP2/AP3. AP0 transmits some data 310 and a trigger frame 312 during a first time period using both a first frequency resource 362 and a second frequency resource 364. Further AP1 is scheduled on a first frequency resource 362 and transmits a data frame 320 and receives a block acknowledge (BA) frame 322 from its associated stations. AP2 and AP3 are scheduled on a second frequency resource 364 and they transmit data frames 330, 340 and receive BA frames 332, 342 from their associated stations. AP0 transmits a Trigger frame 312 to synchronize the transmission time among AP1/AP2/AP3. AP1 and AP2/AP3 operate in CAP-OFDMA manner, and AP2 and AP3 operate in CSR manner.

Figure 3B:
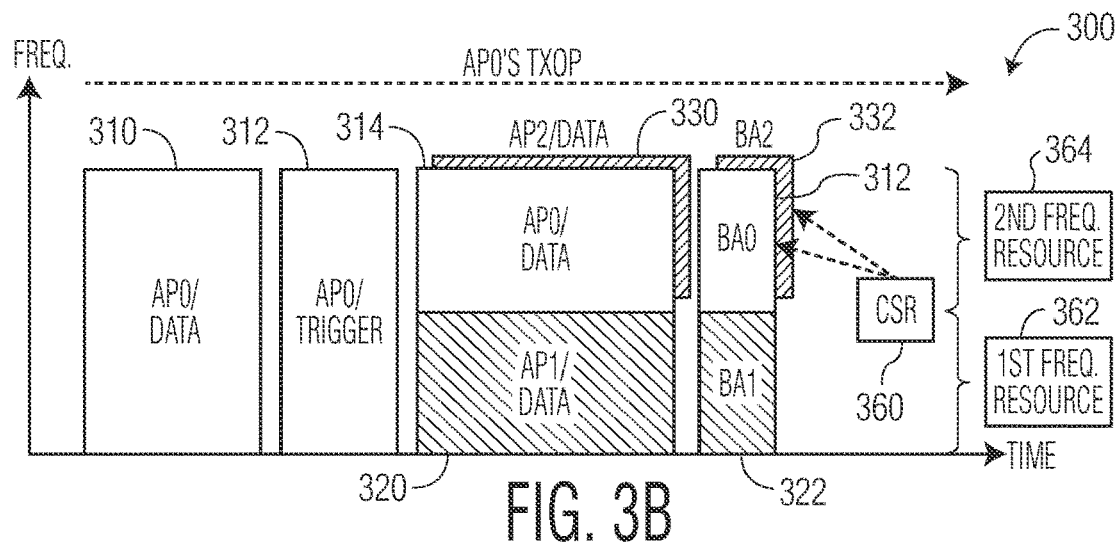
FIG. 3B illustrates the TXOP for AP0 using CAP-OFDMA and CSR with the sharing AP0 participating.

FIG. 3B illustrates the TXOP 300 for AP0 using CAP-OFDMA and CSR with the sharing AP0 participating. AP0 is the TXOP sharing AP. During AP0's TXOP 300, AP0 shares its resources with AP1/AP2. AP0 transmits some data 310 and a trigger frame 312 during a first time period using both a first frequency resource 362 and a second frequency resource 364. Further AP1 is scheduled on a first frequency resource 362 and transmits a data frame 320 and receives a BA frame 322 from its associated stations. AP2 is scheduled on a second frequency resource 364 and transmits data frame 330 and receives BA frame 332 from it associated frames. AP0 transmits a Trigger frame 312 to synchronize transmission time among AP0/AP1/AP2. AP1 and AP0/AP2 operate in CAP-OFDMA manner, and AP0 and AP2 operate in CSR manner.

Figure 3C:
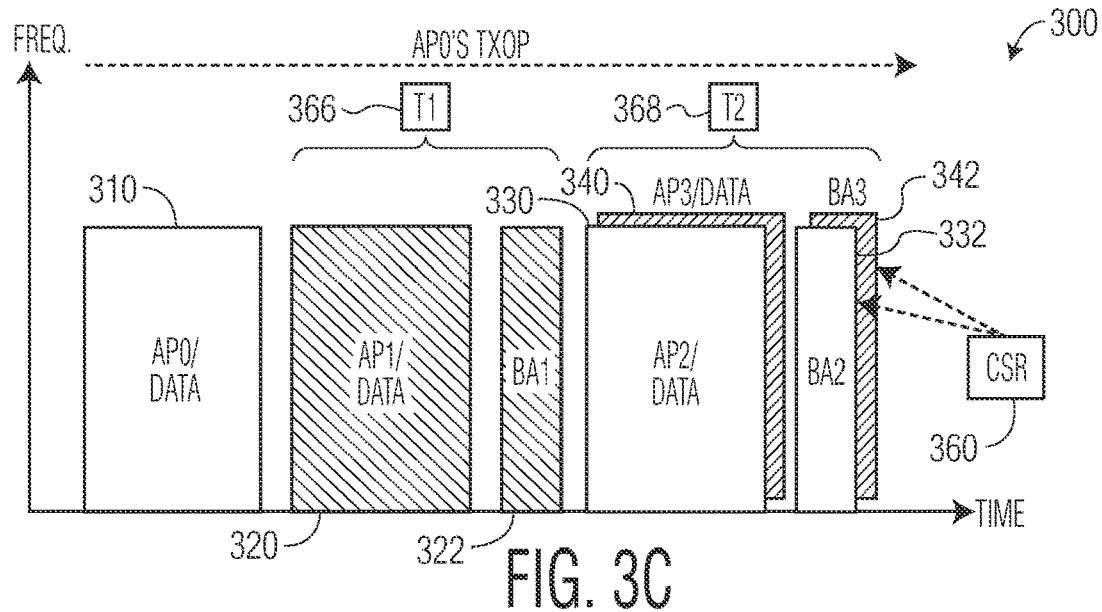
FIG. 3C illustrates the TXOP for AP0 using CAP-TDMA and CSR. AP0 is the TXOP sharing AP.

FIG. 3C illustrates the TXOP 300 for AP0 using CAP-TDMA and CSR. AP0 is the TXOP sharing AP. During AP0's TXOP 300, AP0 shares its resources with AP1/AP2/AP3. AP1 is scheduled on a first time resource T1 366 where it transmits a data frame 320 and receives a BA frame 322 from its associated stations. AP2 and AP3 are scheduled on second time resource T2 368 where they transmit data framers 330, 340 and receive BA frames 332, 342 from their associated stations. AP1 and AP2/AP3 operate in CAP-TDMA manner, and AP2 and AP3 operate in CSR manner.

Figure 3D:
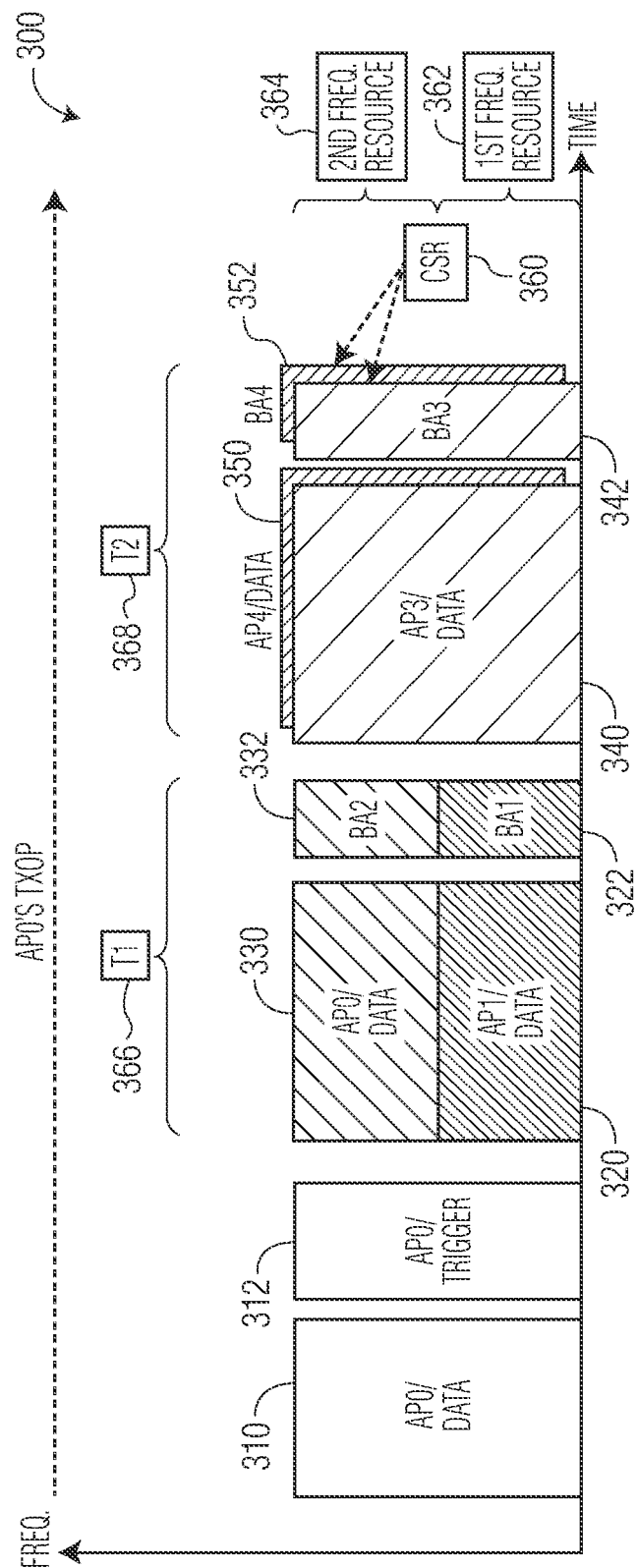
FIG. 3D illustrates the TXOP for AP0 using CAP-OFDMA, CAP-TDMA, and CSR. AP0 is the TXOP sharing AP.

FIG. 3D illustrates the TXOP 300 for AP0 using CAP-OFDMA, CAP-TDMA, and CSR. AP0 is the TXOP sharing AP. During AP0's TXOP 300, AP0 shares its resources with AP1/AP2/AP3/AP4. AP0 transmits some data 310 and a trigger frame 312 during a first time period using both a first frequency resource 362 and a second frequency resource 364. Further AP1 and AP2 are scheduled on a first frequency resource 362 and transmits data frames 320,330 and receives BA frame 322, 332 from their associated stations during a first time resource T1 366. AP3 and AP4 are scheduled on a second time resource 368 and they transmit data frames 340, 350 and receive BA frames 342, 352 from their associated stations during a second time resource T2 368. AP0 transmits the Trigger frame 312 to synchronize transmission time among AP1/AP2/AP3/AP4. AP1 and AP2 operate in CAP-OFDMA manner, AP1/AP2 and AP3/AP4 operate in a CAP-TDMA manner, and AP3 and AP4 operate in CSR manner.

The following frame exchange sequences may be included in the proposed unified CAP-TX framework: CAP-TX polling, scheduling announcement, and data transmission. In CAP-TX polling, the TXOP sharing AP indicates that it will share its resource with TXOP shared APs. Next, the TXOP sharing AP polls resource request from TXOP shared APs. Then the TXOP shared APs report their information such as: indication of participation; amount of resource needed; and preferred (or idle) channels.

The Scheduling announcement may include a frequency/time resource that is scheduled for each scheduled TXOP shared AP. The Scheduling announcement may also include information on PPDU synchronization among multiple TXOP shared APs such as PPDU length/format, long training frame (LTF) type/numbers, SIG field information, Trigger frame information (for upload (UL) TX), etc. The scheduling announcement may also include transmit power and/or interference level constraint and/or MCS margin for CSR operation.

Data transmission in the unified CAP-TX framework include the transmission of data frames by the sharing AP and various shared APs.

Further a scheduling announcement may include a trigger frame that solicits transmission from more than one entity can be used for the scheduling announcement phase. A single Trigger frame may solicit transmission from more than one entity in OFDMA/TDMA/CSR manner. A Trigger frame may include information on transmit power and/or interference level and/or MCS margin. This information may be carried in User Info field of each scheduled entity. This information may be optionally present if the scheduled entity operates in CSR manner.

The scheduling announcement may include the same constraints on transmit power and/or interference level and/or MCS margin for CSR operation that may be applied to all entities participating the CSR operation. These constraints may be included in Common Info field of the Trigger frame. These constraints may be indicated before the Trigger frame is transmitted. At CAP-TX polling phase, early stage of scheduling announce phase, or even broadcasted in a Beacon frame.

If more than one entity share the same resource, the entities conform to the following constraints. The TXOP sharing AP may indicate transmit power constraint and/or interference level constraint and/or MCS margin. Scheduling information for entities that are scheduled on the same resource are carried in a same Trigger frame. Entities that are scheduled on the same resource are indicated in adjacent User Info field within the Trigger frame. When an entity checks the User Info field of a Trigger frame and identifies that the entity is included in one of the User Info field of the Trigger frame, the entity continues to check the User Info field of the Trigger frame until the RU allocation becomes different. When an entity is scheduled for a resource and if no other entity using the same scheduled resource is indicated by the Trigger frame, but if use of CSR on the scheduled resource is indicated by the Trigger frame, the entity is scheduled for CSR operation with the TXOP sharing AP on the scheduled resource.

Use of CSR on a scheduled resource in a Trigger frame can be indicated in multiple ways.

The first way is having a flag that indicates if other entities are scheduled on the same resource or not. This may be a 1-bit indication. In second way, the CSR is not scheduled on the resource if a subfield indicating transmit power constraint and/or Interference level constraint and/or MCS margin is set to a specific value. In a third way, the subfield indicating transmit power constraint and/or interference level constraint and/or MCS margin is present only if the flag indicates that other entities are scheduled on the same resource.

If a Trigger frame schedules two groups of resources, wherein the first group of resources does not operate in a CSR manner and the second group of resources operates in a CSR manner, the User Info fields corresponding to the first group of resources is located in front of User Info fields corresponding to the second group of resources within the Trigger frame. This restriction is made because an entity that does not support CSR operation should not have any problem in parsing the Trigger frame information.

Figure 4:
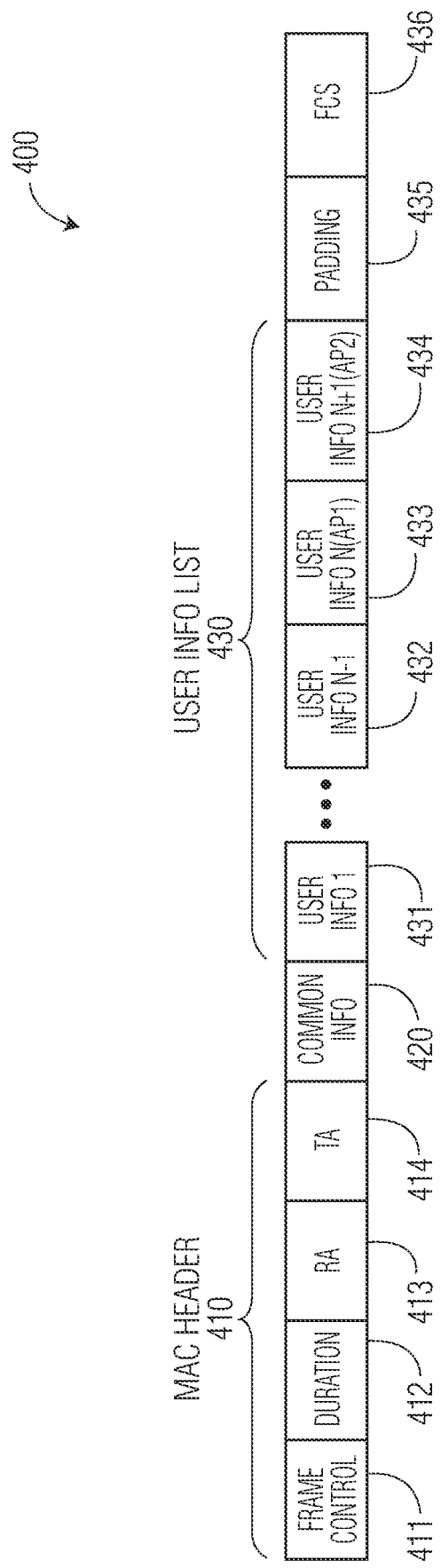
FIG. 4 illustrates an example of a Trigger frame.

FIG. 4 illustrates an example of a Trigger frame. The Trigger frame 400 includes a MAC header 410, Common Info 420, and User Info List 430. The MAC header 410 includes a Frame Control field 411, a Duration field 412, a receive address (RA) 413, and a transmit address (TA) 414. The User Info List 430 includes User Info 1431, User Info N−1 432, User Info N(AP1) 433, and User Info N+1(AP2) 434, a Padding field 435, and a frame check sequence (FCS) 436.

When a CAP-TX includes AP1 and AP2 for CSR operation on resource 1, resource 1 is the only resource that CSR is scheduled on by the Trigger frame. The Trigger frame includes User Info fields for both AP1 and AP2. User Info field N 433 corresponds to AP1 and User Info field N+1 434 corresponds to AP2, and these are adjacent each other. User Info field N 433 and User Info field N+1 434 are the last User Info fields in the Trigger frame. RU Allocation information on both the User Info field N 433 and User Info field N+1 434 indicates resource 1. User Info field N 433 and User Info field N+1 434 may have a subfield indicating restrictions/constraints on transmit power, interference level, or MCS margin.

The TXOP shared AP's behave as follows. The TXOP shared AP's receive a CAP-TX polling frame from the TXOP sharing AP and transmit a response frame, wherein the response frame may comprise at least some of the following information: the TXOP shared AP wants to participate the CAP-TX; and the AP's resource needs and preferred (or idle) channel information.

The TXOP shared APs receive a Trigger frame that is a scheduling announcement frame, wherein the Trigger frame indicates a first resource that the TXOP shared AP is scheduled for CAP-TX. The TXOP shared AP checks to determine if there is another AP scheduled on the first resource. If there is no other AP/STA scheduled on the first resource, the TXOP shared AP initiates a frame exchange on the first resource. If there is one or more APs/STAs scheduled on the first resource, the TXOP shared AP further considers constraints on transmit power and/or interference level and/or MCS margin in determining the transmit parameters of DL/UL PPDUs, and the shared AP initiates a frame exchange on the first resource with the considered constraints.

Even though examples shown in this disclosure include DL transmission only during a TXOP sharing AP's TXOP, the TXOP shared AP may initiate a frame exchange for UL transmission without loss of generality. When more than one entity is scheduled for transmission on a resource, the indication on transmit power and/or interference level and/or MCS margin on a Trigger frame may include the following information. If the Trigger frame schedules DL transmission from more than one entity, maximum transmit power is included. If the Trigger frame schedules UL reception by more than one entity, the maximum transmit power for a frame transmission from the entity (that triggers UL transmission) and the maximum interference level toward the other entity that are scheduled on the same resource (that UL transmission will impose) is included. In one embodiment, the Trigger frame may have a UL/DL indicator, and if the UL/DL indicator indicates a DL transmission, a first field for a TXOP shared AP indicates an information on a maximum transmit power level. If the UL/DL indicator indicates a UL transmission, the first field for a TXOP shared AP indicates an information on maximum interference level toward the other entity that are scheduled on the same resource.

In another embodiment, the Trigger frame has a UL/DL indicator, and an information on maximum interference level toward the other entity that are scheduled on the same resource is additionally indicated using a first field if the UL/DL indicator is set to UL transmission.

Throughout this disclosure, when a transmit power is mentioned, it may be defined in multiple ways that may include (but not limited to) total transmission power, transmission power per tone, equivalent transmission power for 20 MHz bandwidth, transmission power for the allocated resource, etc.

Throughout this disclosure, when a interference level is mentioned, it may be defined in multiple ways that may include (but not limited to) total interference power, interference power per tone, equivalent interference power for 20 MHz bandwidth, interference power for the allocated resource, etc.

An example of a MCS level calculation for DL CSR operation will now be described. In this example, a CAP-TX includes AP1 and AP2 for CSR operation on resource 1, wherein resource 1 is scheduled by a Trigger frame 400. User Info field N 433 corresponds to AP1, and User Info field N+1 434 corresponds to AP2. User Info field N 433 may include information that its maximum transmit power is P1. User Info field N+1 434 may include information that its maximum transmit power is P2. When the AP1 receives the Trigger frame, the AP1 extracts both P1 and P2. AP1 decides to schedule a DL transmission to STA1 that is associated with the AP1. AP1 has information on the path loss between STA1 and AP2 (PL2) before AP receives the Trigger frame 400. Based on PL2 and P2, AP may identify expected interference level from AP2 to STA1 for DL reception. Based on its transmit power limitation (P1) and based on the expected interference level from AP2 to STA1, AP may determine the expected signal-to-interference-plus-noise ratio (SINR) for its transmission to STA1. Based on the expected SINR information, AP1 decides its MCS level for DL transmission.

An example of MCS level calculation for UL CSR operation will now be described. In this example, a CAP-TX includes AP1 and AP2 for CSR operation on resource 1, wherein resource 1 is scheduled by a Trigger frame 400. User Info field N 433 corresponds to AP1, and User Info field N+1 434 corresponds to AP2. User Info field N 433 includes an information that maximum allowed interference level is I1. User Info field N+1 434 may include information that its maximum allowed interference level is I2. When the AP1 receives the Trigger frame 400, the AP1 extracts both I1 and I2. AP1 decides to schedule a UL transmission from STA1 that is associated with the AP1. AP1 has information on the path loss between STA1 and AP2 (PL2) before AP1 receives the Trigger frame 400. Based on PL2 and I1, AP may determine the maximum allowed transmit power from STA1 (P_tx1) such that its interference to AP2 is less than I1. Based on the identified P_tx1, AP1 may identify estimated received signal power from AP1 (P_rx1). Based on P_rx1 and I2, AP1 may identify expected SINR for transmission from STA1. Based on the expected SINR information, AP1 decides its MCS level for UL transmission.

CAP-TX in EHT will define a procedure for an AP to share its frequency/time resources of an obtained TXOP with a set of APs. Coordinated OFDMA is supported in EHT, and in a coordinated OFDMA, both DL OFDMA and its corresponding UL OFDMA acknowledgement are allowed. EHT will define a mechanism to determine whether an AP is part of an AP candidate set and can participate as a shared AP in Coordinated AP transmission initiated by a sharing AP. An AP that intends to use the resource (i.e., frequency or time) shared by another AP shall be able to indicate its resource needs to the AP that shared the resource. An EHT AP supporting Multi-AP coordination may send a frame (e.g., Beacon or other management frame) including capabilities of Multi-AP transmission schemes. An EHT AP which obtains a TXOP and initiates the Multi-AP coordination is the Sharing AP. An EHT AP which is coordinated for the Multi-AP transmission by the Sharing AP is the Shared AP.

The Coordinated AP transmission (CAP-TX) may include following frame exchange sequences: polling state; announce state; and coordinated transmission stage. In the polling stage, the TXOP sharing AP polls resource request from (candidate) TXOP shared APs. During the announce stage, the TXOP sharing AP announces the parameters for CAP-TX such that TXOP shared AP may initiate its transmission sequence on the allocated resource. During the coordinated transmission stage, the TXOP shared APs initiate transmission sequence to their associated STAs.

One issue that arises during CAP-TX is how to support multiple BSS identifiers (BSSIDs). During the polling state of CAP-TX, a TXOP shared AP indicates its resource needs to a TXOP sharing AP. If the TXOP shared AP supports multiple BSSIDs and if there are one or more APs corresponding to non-transmitted BSSIDs in a multiple BSSID set of the TXOP shared AP, the TXOP shared AP have multiple logical APs. That is, an AP corresponding to transmitted BSSID, and/or one or more APs corresponding to non-transmitted BSSIDs in the multiple BSSID set. As a result, a mechanism is needed for the TXOP sharing AP to request and get response from the APs corresponding to non-transmitted BSSID regarding information of the resource needs.

A few different options for multiple BSSID support will be described below. In a first option, when a group of APs form a candidate set for CAP-TX, a unique identification number is assigned to an AP within the group of APs, wherein the AP is composed of one logical AP corresponding to a transmitted BSSID and zero or more logical APs corresponding to non-transmitted BSSIDs in a multiple BSSID set of the AP. When a TXOP sharing AP requests information of resource needs to a TXOP shared AP, the TXOP shared AP indicates the combined resource needs of its logical AP corresponding to transmitted BSSID and zero or more logical APs corresponding to non-transmitted BSSID in the multiple BSSID set of the TXOP shared AP. The TXOP sharing AP may not know how much of resource out of the indicated resource needs is from the logical AP corresponding to the transmitted BSSID. When a TXOP shared AP is composed of a logical AP corresponding to a transmitted BSSID and one or more logical APs corresponding to non-transmitted BSSIDs, a TXOP sharing AP schedules a resource for CAP-TX per the TXOP shared AP. The TXOP sharing AP does not indicate resources for each logical AP corresponding to transmitted/non-transmitted BSSID within the scheduled resource. When a TXOP sharing AP schedules a resource for a TXOP shared AP in CAP-TX, the TXOP shared AP decides how to schedule STAs associated with a logical AP corresponding to transmitted BSSID or non-transmitted BSSID(s).

In a second option for multiple BSSID support, when a group of APs forms a candidate set for CAP-TX, a unique identification number is assigned to a logical AP within the group of APs, wherein the logical AP may correspond to a non-transmitted BSSID in a multiple BSSID set. An ID is given to each transmitted/non-transmitted BSSID. When a TXOP sharing AP requests information of resource needs to a TXOP shared AP, the TXOP shared AP indicates resource needs for each logical AP corresponding to a transmitted/non-transmitted BSSID. The TXOP sharing AP may know how much of a resource is needed for each logical AP corresponding to each transmitted/non-transmitted BSSID of the TXOP shared AP. When a TXOP shared AP is composed of a logical AP corresponding to a transmitted BSSID and one or more logical APs corresponding to non-transmitted BSSIDs, a TXOP sharing AP schedules a resource for CAP-TX for each logical AP corresponding to transmitted or non-transmitted BSSID of the TXOP shared AP. The TXOP sharing AP indicates resource for each (transmitted or non-transmitted) BSSID separately.

Figure 5:
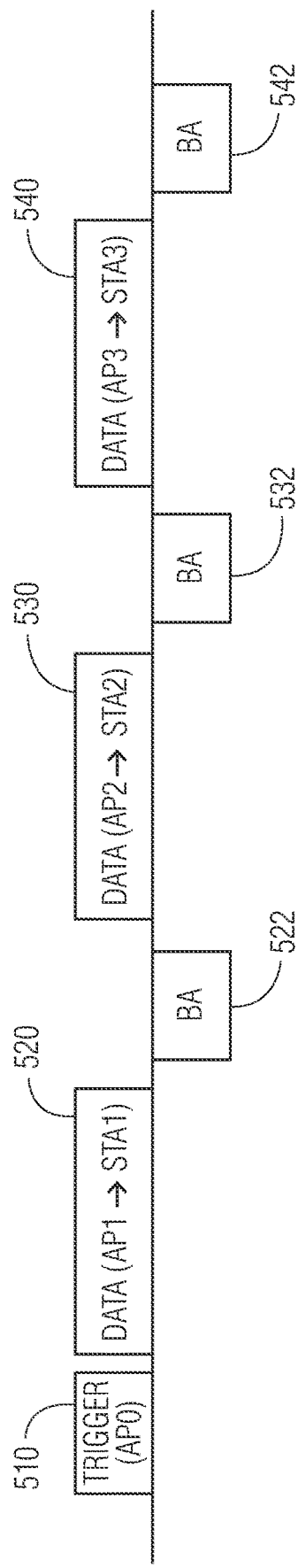
FIG. 5 illustrates a single trigger frame from the sharing AP triggering multiple frame exchanges using TDM.
Figure 6:
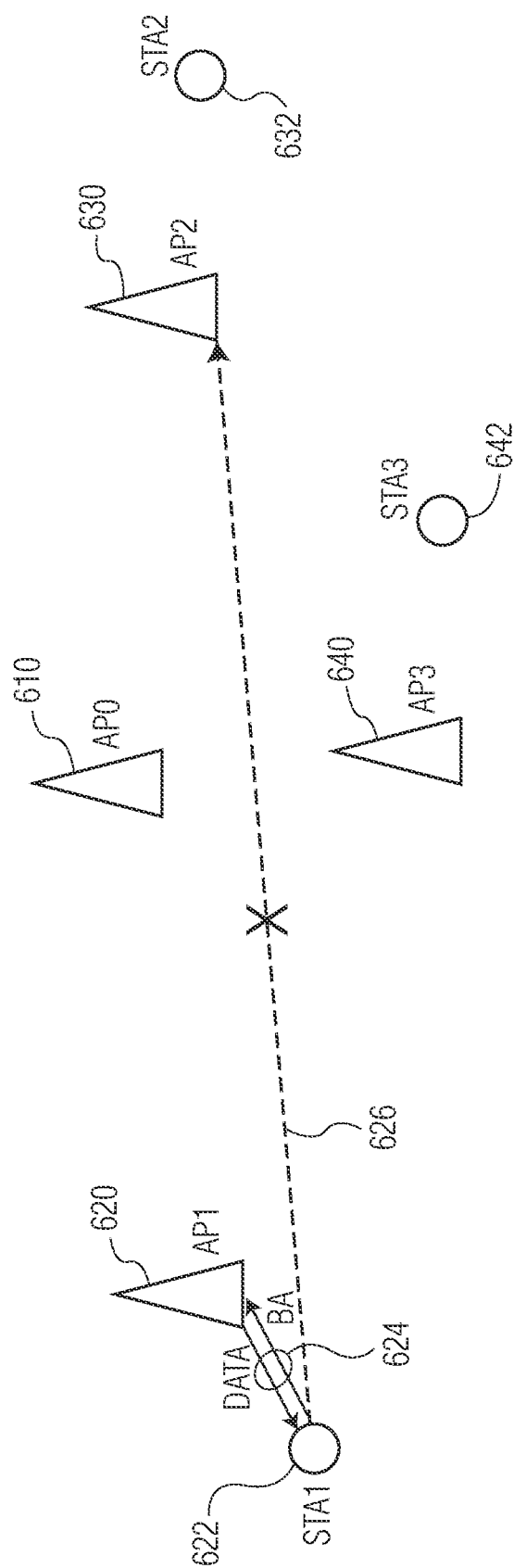
FIG. 6 illustrates a system with a plurality of APs communicating using CAP TDM.

Issues may arise during CAP TDM transmission. CAP TDM transmission, there are two possible operation scenarios. In the first case, TXOP sharing AP's trigger frame triggers multiple frame exchanges using TDM. FIG. 5 illustrates a single trigger frame from the sharing AP triggering multiple frame exchanges using TDM. FIG. 6 illustrates a system with a plurality of APs communicating using CAP TDM. The sharing AP AP0 610 transmits a trigger frame 510. In response AP1 620 transmits data 520 to STA1 622. STA1 622 replies with a block acknowledge (BA) 522. Further, AP2 630 then transmits data 530 to STA2632. STA2 632 replies with a BA 532. Finally, AP3 640 then transmits data 540 to STA3 642. STA3 642 replies with BA 542. A station STA1 622 may communicate data 624 with AP1 620. If AP2 630 is far away from AP1 622/STA1 622, AP2 630 may not hear 626 the BA 522 to AP 620, and thus, cannot initiate its transmission of data 530 in SIFS time right after BA 522 to AP1 620.

Figure 7:
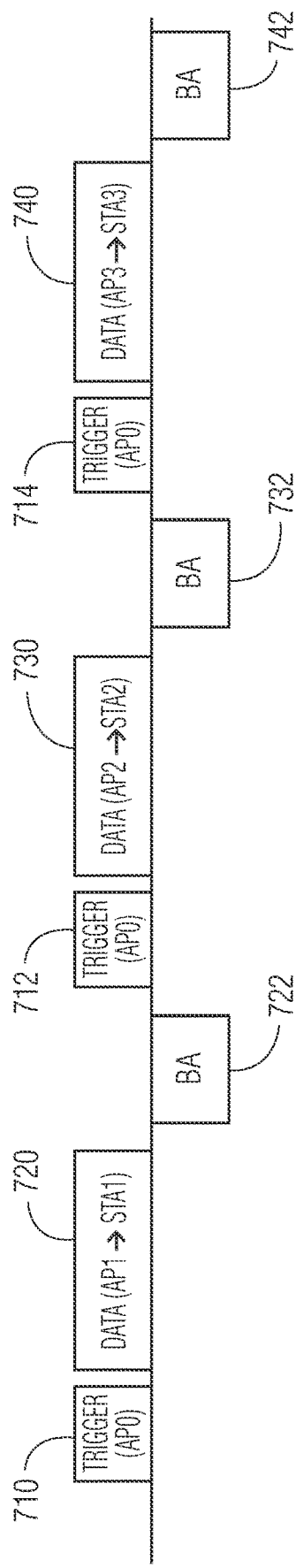
FIG. 7 illustrates the TXOP sharing AP transmitting a trigger frame for each frame exchange.
Figure 8:
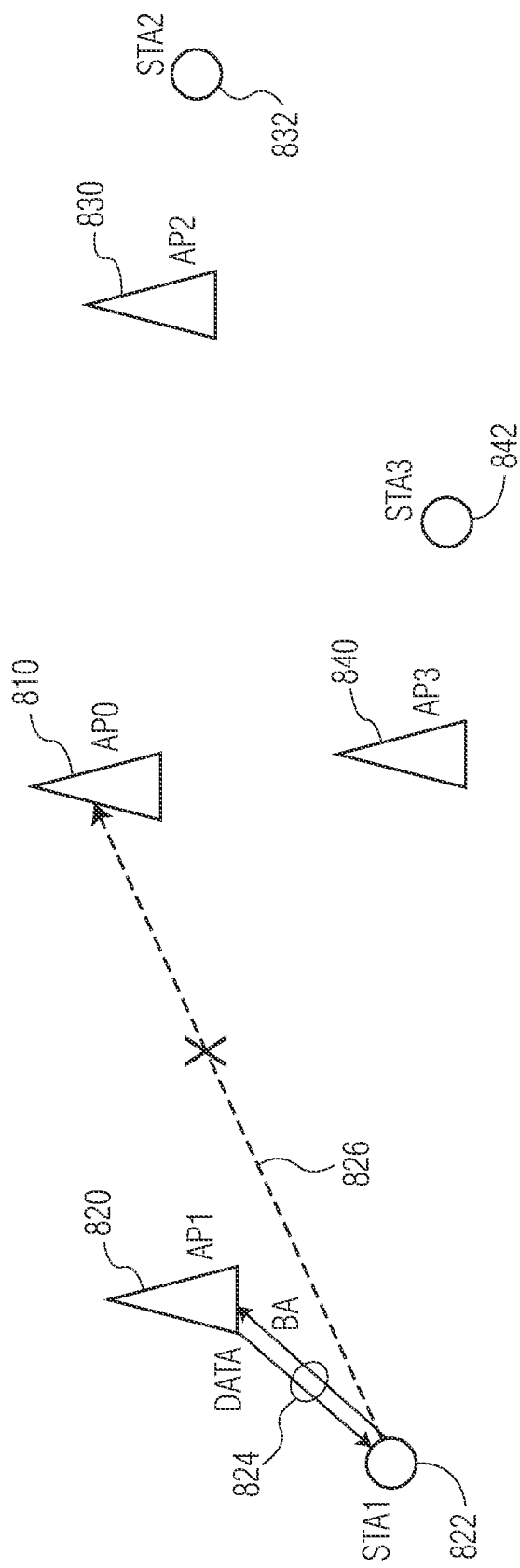
FIG. 8 illustrates a system with a plurality of APs communicating using CAP TDM.

In the second case, for each frame exchange in time, the TXOP sharing AP transmits a trigger frame. FIG. 7 illustrates the TXOP sharing AP transmitting a trigger frame for each frame exchange. FIG. 8 illustrates a system with a plurality of APs communicating using CAP TDM. The sharing AP AP0 810 transmits a trigger frame 710. In response AP1 820 transmits data 720 to STA1 822. STA1 822 replies with a BA 722. Next, the sharing AP AP0 810 transmits a trigger frame 712. AP2 830 in response to trigger frame 712 then transmits data 730 to STA2 832. STA2 832 replies with a BA 732. Then, the sharing AP AP0 810 transmits a trigger frame 714. Finally, AP3 840 then transmits data 740 to STA3 842. STA3 842 replies with BA 742. A station STA1 822 may communicate data 824 with AP1 820. Likewise station STA2 832 and station STA3 842 may communicate with associated APs AP2 830 and AP3 840 respectively. If AP0 810 is far away from STA1 822, AP0 810 may not hear 826 the BA 722 to AP1 820, and thus, AP0 810 cannot initiate its transmission of Trigger frame 712 in SIFS time right after BA 722 to AP2 830.

A solution to the first case may include the following steps. When a first STA initiates a frame exchange with a second STA by transmitting a first frame at a time that is scheduled by a TXOP sharing AP, the first STA performs channel assessment a predetermined time prior to the first frame transmission. Further, the first STA may be a TXOP shared AP, and the predetermined time may be SIFS. For example, the STA transmits the first frame if the CS mechanism indicates that the medium is idle at the SIFS slot boundary.

Two different solutions for the second case are possible. The first solution may include the following steps. When a TXOP sharing AP transmits a Trigger frame that initiates a first frame exchange between a first STA and a second STA, wherein a second frame exchange happened between a third STA and a fourth STA right before the start of the first frame exchange and wherein the third STA and the fourth STA are not associated with the TXOP sharing AP, the TXOP sharing AP performs a channel assessment a predetermined time prior to the Trigger frame transmission. The predetermined time may be SIFS. For example, the TXOP sharing AP transmits the Trigger frame if the CS mechanism indicates that the medium is idle at the SIFS slot boundary.

A second solution may include the following steps. When a TXOP sharing AP schedules a service time for a first STA within the TXOP sharing AP's TXOP duration: the TXOP sharing AP transmits a Trigger frame at the beginning of the service time, and the first STA initiates a frame exchange in response to the reception of the Trigger frame; the first STA transmits an indication frame to the TXOP sharing AP (at the end of the service time) to indicate to the TXOP sharing AP that the current frame exchange is finished; and in response to the reception of the indication frame from the first STA, the TXOP sharing AP transmits another frame during the TXOP. In one embodiment, the first STA is a TXOP shared AP.

In one embodiment, the other frame is another Trigger frame that is sent to another STA, and wherein the other STA initiates another frame exchange in response to the reception of the other Trigger frame. In another embodiment, the other STA is another TXOP shared AP.

Another issue may arise when a TXOP sharing AP is sharing its resources with shared APs. During a TXOP of a TXOP sharing AP, time/frequency resources of the TXOP sharing AP may be shared with one or more TXOP shared APs. After the end of a service period (SP) for CAP-TX during the TXOP, the TXOP sharing AP may continue data exchange during the TXOP. However, it is possible that frame exchange may fail during the TXOP shared APs SP but the TXOP sharing AP may not notice the failure of the frame exchange. Also, it is possible that the TXOP sharing AP may not hear the final frame transmission at the end of the SP for CAP-TX even though the frame exchange was successful by the one or more TXOP shared APs.

Figure 9:
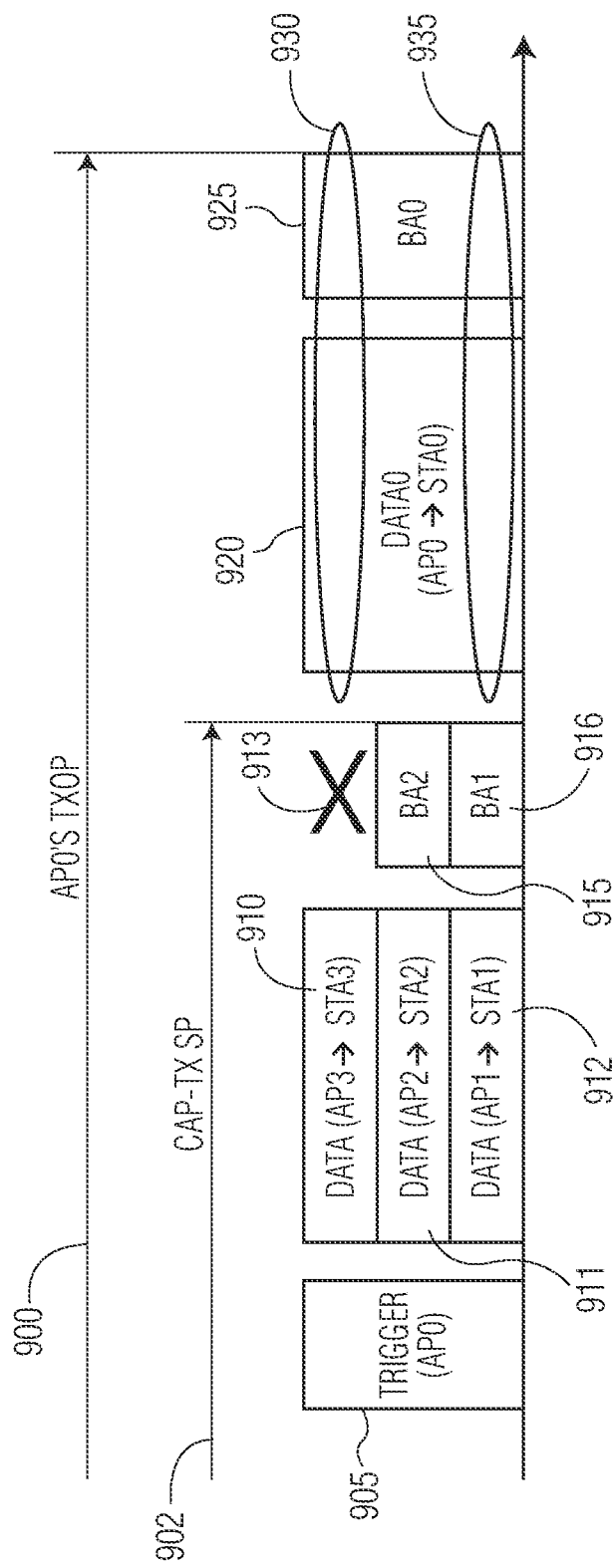
FIG. 9 illustrates an example of a TXOP for an AP transmitting using download (DL) OFDMA.

FIG. 9 illustrates an example of a TXOP for an AP transmitting using DL OFDMA. The AP0 TXOP 900 starts with the AP0 transmitting a Trigger frame 905. Next, a CAP-TX SP 902 occurs. The CAP-TX SP 902 includes data transmission from AP3 to STA3 910, AP2 to STA2 911, and AP1 to STA1 912 on different frequencies using OFDMA. Then STA2 sends a BA 915 to AP2, and STA 1 sends a BA 916 to AP1 912. In this situation, STA3 does not send a BA 913 which is denoted as 913. Next, AP0 initiates a data transmission 920 to STA using the available frequencies. STA0 send a BA 925 in response to the data transmission 920. Further, STA1 is far away from AP0 935, so AP0 is unable to hear the BA 916 from STA1.

FIG. 9 illustrates two potential problems, 930,935 with shared TXOP transmission: no BA is transmitted 913 by one of the STAs 930 and AP0 is too far away from a station STA1 935 to hear its BA 916. During a TXOP of a TXOP sharing AP, time/frequency resources of the TXOP sharing AP may be shared with one or more TXOP shared APs. After the end of a service period for CAP-TX during the TXOP, the TXOP sharing AP may continue data exchange during the TXOP. However, it is possible that frame exchange may fail during the TXOP shared AP's SP but the TXOP sharing AP may not notice the failure of the frame exchange. Also, it is possible that the TXOP sharing AP may not hear the final frame transmission at the end of the SP for CAP-TX even though the frame exchange was successful by the one or more TXOP shared APs. If the final transmission is from the STA1 to AP1 912 and the distance between the STA1 and AP0 is large, the received signal strength of the final frame from the STA1 at the AP0 is low such that detection at AP0 is not possible.

A first solution to these problems when a TXOP sharing AP (AP0) shares its resource with one or more TXOP shared APs (AP1, AP2, AP3) for a coordinated AP transmission in a TXOP of the TXOP sharing AP may include the following steps. The one or more TXOP shared APs initiate one or more frame exchange with one or more STAs. The coordinated AP transmission may happen during a first time period (CAP-TX service period 902) within the TXOP 900. The TXOP sharing AP (AP0) may continue its own frame transmission (at the end of the first time period), if the TXOP sharing AP successfully receive at least one acknowledgement frame (e.g., BA1 916 or BA2 915) of the one or more frame exchange.

Further embodiments for when the TXOP sharing AP continues its own frame transmission, include using the transmission bandwidth as follows: using a subset of frequency resources associated one or more TXOP shared APs for which the TXOP sharing AP successfully received last frame; using a subset of the bandwidth that the TXOP sharing AP granted to TXOP shared APs (for the CAP-TX service period); or using a subset of the bandwidth that the TXOP sharing AP used right before the CAP-TX service period.

Figure 10:
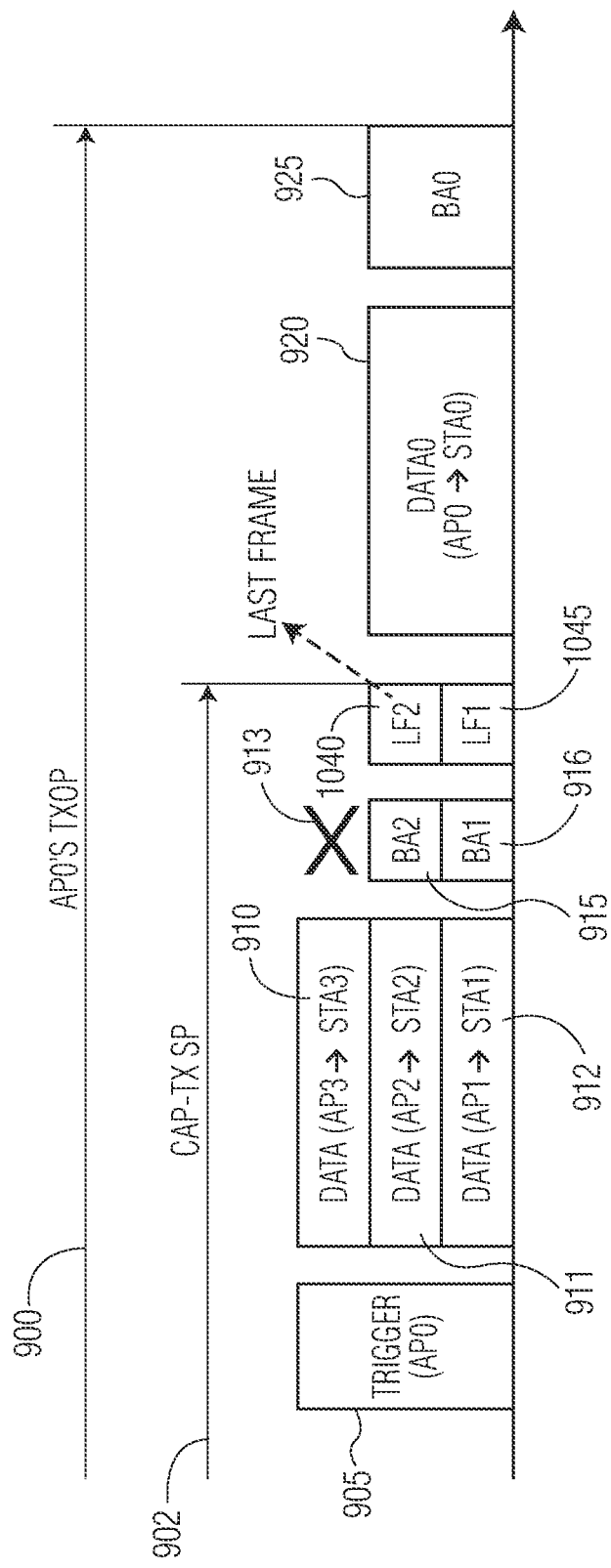
FIG. 10 illustrates a second solution to the problem of the TXOP sharing AP not receiving a BA frame from one or more of the shared APs.

FIG. 10 illustrates a second solution to the problem of the TXOP sharing AP not receiving a BA frame from one or more of the shared APs. FIG. 10 is the same as FIG. 9, but with the addition of two last frames LF1 1045 and LF2 1040. If a frame exchange is successful for a TXOP shared AP during a CAP-TX service period, the TXOP shared AP transmits a last frame LF1 1045 or LF2 1040 on its scheduled frequency resource to a TXOP sharing AP that indicates the last transmission from the shared APs during the CAP-TX service period. A SIFS period after the reception time of the last frame, the TXOP sharing AP continues its own frame transmission 925 during a TXOP 900 on a bandwidth if the TXOP sharing AP receives the last frame from at least one of TXOP shared APs. As shown by 925 in FIG. 10, the TXOP sharing AP (AP0) transmits only on the frequencies used by AP1 and AP2, because only last frames LF1 1045 and LF2 1040 were received for those shared APs.

Further embodiments for overcoming this problem may include the following. The TXOP sharing AP may indicate information on PHY parameters to be used for the transmission of the last frame to the one or more TXOP shared APs before the transmission of the last frame. A Trigger frame that solicits the CAP-TX may carry the information. The last frame is carried in a non-HT (high throughput) or a non-HT duplicate PPDU format. The TXOP shared AP transmits the last frame on a frequency resource within the scheduled frequency resource that the TXOP shared AP received an acknowledgement frame from its peer STA(s). The first bandwidth is a subset of frequency resources that the last frames were successfully received from one or more TXOP shared APs. The first bandwidth is a subset of the bandwidth that the TXOP sharing AP granted to TXOP shared APs for the CAP-TX service period. The first bandwidth is a subset of the bandwidth that the TXOP sharing AP used right before the CAP-TX service period. The first bandwidth is an integer multiple of 20 MHz channel. The first bandwidth shall include primary channel(s). If there is no last frame that is successfully received, the TXOP sharing AP does not commence the transmission SIFS after the expected reception time of the last frame. In this case, the TXOP sharing AP may perform PIFS recovery. If the last frame is not successfully received on a primary 20 MHz channel of the TXOP sharing AP, the TXOP sharing AP shall not commence the transmission a SIFS period after the reception time of the last frame. In this case, the TXOP sharing AP may perform PIFS recovery. For a frequency resource that the TXOP sharing AP does not receive the last frame successfully, the TXOP sharing AP performs a channel assessment during PIFS before the start time of the TXOP sharing AP's transmission, and if the channel is idle on the frequency resource, the first bandwidth further may include (a subset of) the frequency resource.

A third solution for solving the above problems includes: at the end of a CAP-TX service period within a TXOP of a TXOP sharing AP, the TXOP sharing AP performs channel assessment during a predetermined time. Then at a predetermined time after the expected end time of the CAP-TX service period, the TXOP sharing AP continues its own frame transmission during the TXOP on a first bandwidth if the channel assessment result is idle.

Further embodiments associated with the third solution include the following. The first bandwidth is a subset of frequency resources that the channel assessment result is idle. The first bandwidth is the same with the bandwidth that the TXOP sharing AP granted to TXOP shared APs for the CAP-TX service period. The first bandwidth is the same with the bandwidth that the TXOP sharing AP used right before the CAP-TX service period. The first bandwidth is integer multiple of 20 MHz channel. The first bandwidth shall include primary channel(s). The channel assessment from the TXOP sharing AP occurs during SIFS time before the start of its transmission. The channel assessment from the TXOP sharing AP occurs during PIFS time before the start of its transmission. The predetermined time is SIFS. If the channel assessment from the TXOP sharing AP on a primary 20 MHz channel is busy, the TXOP sharing AP shall not commence the transmission the predetermined time after the expected end time of the CAP-TX service period. In this case, the TXOP sharing AP may perform PIFS recovery. If the channel assessment from the TXOP sharing AP is busy for all frequency resources for the CAP-TX service period, the TXOP sharing AP shall not commence the transmission the predetermined time after the expected end time of the CAP-TX service period. In this case, the TXOP sharing AP may perform PIFS recovery.

A fourth solution includes: TXOP sharing AP shares its TXOP with other STAs (e.g., TXOP shared APs) at the end of its TXOP. In one embodiment, at the end of a CAP-TX service period during a TXOP of a TXOP sharing AP, if there is non-zero remaining TXOP duration, the TXOP sharing AP shall terminate/truncate the TXOP and may send CF-End frame with PIFS check.

A fifth solution includes a TXOP sharing AP occupying a primary channel of the TXOP sharing AP's TXOP during a CAP-TX service period.

Even though examples shown in this disclosure include TXOP sharing with TXOP shared APs during a TXOP sharing AP's TXOP, the same concept may be applied to cases where TXOP sharing AP's TXOP is shared with any STAs without loss of generality. For example, the above solutions that are applied to overcome two potential problems shown in FIG. 9 may be applied to cases that the CAP-TX service period is shared to a non-AP STA, wherein the non-AP STA initiates its own transmission exchange with another non-AP STA, without loss of generality.

Examples of sharing a TXOP of a TXOP sharing AP with another STA will now be described. In one embodiment, a method for sharing a TXOP of a master AP with a first STA comprises transmission of a first trigger frame from the master AP to the first STA, wherein the first trigger frame schedules a first service period (SP) that the master AP's TXOP is shared with the first STA during the first SP. The master AP identifies that the first STA transmits a first frame in response to the reception of the first trigger frame. At the end of the first SP, the master AP checks if a wireless medium is idle for a predetermined time duration. In response to identifying that the wireless medium is idle for the predetermined time duration, the master AP resumes its frame exchange by transmitting a second frame immediately. In one embodiment, the first STA is another AP. In another embodiment, the first STA is a non-AP station. In one embodiment, the predetermined time duration is SIFS. In another embodiment, the predetermined time duration is PIFS.

In one embodiment, a method for sharing a TXOP of a master AP with a first STA comprises transmission of a first trigger frame from the master AP to the first STA, wherein the first trigger frame schedules a first service period (SP) that the master AP's TXOP is shared with the first STA during the first SP. The master AP identifies that the first STA transmits a first frame in response to the reception of the first trigger frame. The master AP receives a second frame from the first STA during the first SP, wherein the second frame indicates that the second frame is the last frame during the first SP. The master AP resumes its frame exchange by transmitting a third frame in SIFS time after reception of the second frame. In one embodiment, the first STA is another AP. In another embodiment, the first STA is a non-AP station.

The system and method described herein may be carried out using specific hardware to perform the actions or software running on a processor may implement the embodiments, for example as described in FIG. 1. The processor may be connected to memory and storage, where the software instructions are stored in the storage. The processor may be any general purpose processor, a graphics processor, a signal processor, or any other type of specialized processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for joint sounding by a client with a master access point (AP) and a slave AP, comprising:

receiving a message from the master AP;

applying network allocation vector (NAV) rules to update NAV values, wherein the received message which is identified as inter-BSS causes an intra-basic service set (BSS) NAV to be set based on the updated NAV values when a transmit address (TA) of the received message has a prespecified value;

receiving a first trigger frame identified as inter-BSS, the trigger frame having a TA with the prespecified value; and transmitting a first channel state information (CSI) to the master AP when the channel is idle based on the updated NAV values of the intra-BSS NAV in response to the trigger frame.

2. The method of claim 1, further comprising:

receiving a second message from the slave AP after the first CSI is transmitted;

receiving a second trigger frame from the master AP; and transmitting a second channel state information (CSI) to the slave AP when the channel is idle based upon the updated NAV value in response to the second trigger frame.

3. The method of claim 1, wherein the intra-basic service set (BSS) NAV is set based on a parameter TXOP_DURATION of the received message being set to UNSPECIFIED.

4. The method of claim 1, wherein the intra-basic service set (BSS) NAV is set based on a parameter BSS_COLOR of the received message being set to a predetermined value.

5. The method of claim 1, wherein the intra-basic service set (BSS) NAV is set based on a receive address (RA) field being set to a broadcast address and a client identifier for the client being included in the first message.

6. A method for joint sounding by a client with a master access point (AP) and a slave (AP), comprising:

receiving a message from the master AP;

applying network allocation vector (NAV) rules to update a NAV values, wherein the received message which is identified as inter-BSS causes an intra-basic service set (BSS) NAV to be set based on the updated NAV values when a transmit address (TA) of the received message being equal to the TA of any of APs participating in the joint sounding, a receive address (RA) field being set to a broadcast address, and a client identifier for the client being included in the first message;

receiving a first trigger frame identified as inter-BSS, the trigger frame having a TA with the prespecified value; and transmitting a first channel state information (CSI) to the master AP when the channel is idle based on the updated NAV value of the intra-BSS NAV in response to the trigger frame.

7. The method of claim 6, further comprising:

receiving a second message from the slave AP after the first CSI is transmitted;

receiving a second first trigger frame from the master AP; and transmitting a second channel state information (CSI) to the slave AP when the channel is idle based upon the updated NAV value in response to the second trigger frame.

8. The method of claim 6, wherein the intra-basic service set (BSS) NAV is set based on a parameter TXOP_DURATION of the received message being set to UNSPECIFIED.

9. The method of claim 6, wherein the intra-basic service set (BSS) NAV is set based on a parameter BSS_COLOR of the received message being set to a predetermined value.

* * * * *